US006799206B1

(12) United States Patent
Workman et al.

(10) Patent No.: US 6,799,206 B1
(45) Date of Patent: Sep. 28, 2004

(54) SYSTEM AND METHOD FOR THE INTELLIGENT MANAGEMENT OF ARCHIVAL DATA IN A COMPUTER NETWORK

(75) Inventors: Kevin M. Workman, San Diego, CA (US); Steven B. Downs, San Diego, CA (US); Mikel J. Featherston, El Cajon, CA (US); Earl N. Waud, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1042 days.

(21) Appl. No.: 09/053,379

(22) Filed: Mar. 31, 1998

(51) Int. Cl.[7] ............................................. G06F 15/173
(52) U.S. Cl. ........................................................ 709/223
(58) Field of Search ........................... 707/1, 202, 204; 711/162, 161; 709/203, 217

(56) References Cited

U.S. PATENT DOCUMENTS

| | | | | |
|---|---|---|---|---|
| 5,455,946 A | * | 10/1995 | Mohan et al. | 707/202 |
| 5,559,991 A | * | 9/1996 | Kanfi | 711/162 |
| 5,764,972 A | * | 6/1998 | Crouse et al. | 707/1 |
| 5,765,173 A | | 6/1998 | Cane et al. | 707/204 |
| 5,778,395 A | | 7/1998 | Whiting et al. | 707/204 |
| 5,794,254 A | | 8/1998 | McClain | 707/204 |
| 5,909,700 A | * | 6/1999 | Bitner et al. | 711/162 |
| 5,987,575 A | * | 11/1999 | Yamaguchi | 711/162 |
| 6,014,676 A | * | 1/2000 | McClain | 707/204 |
| 6,157,931 A | | 12/2000 | Cane et al. | 707/204 |
| 6,173,376 B1 | | 1/2001 | Fowler et al. | 711/162 |

FOREIGN PATENT DOCUMENTS

| | | |
|---|---|---|
| WO | 9604671 | 2/1996 |
| WO | 9704391 | 2/1997 |

* cited by examiner

*Primary Examiner*—Paul H. Kang
(74) *Attorney, Agent, or Firm*—Philip R. Wadsworth; Thien T. Nguyen; Pavel Kalousek

(57) ABSTRACT

A system for intelligently managing data in the archival and restoration processes of computer workstations located in a computer network. The system allows quicker, smaller backups of the computer network while facilitating the restoration process. The system identifies redundant data found in a pre-determined number of the computer workstations and copies them to a common storage area located on a high-speed storage medium. Placeholders are then placed into the archive file of any workstation that contained the redundant data. The system also identifies unique data present on the computer workstations and places them in the archive file as is the conventional practice. The system also provides, as part of an Inclusion/Exclusion Engine, intelligent rules for MIS personnel on the server-level to exclude files and directories deemed unique garbage and to include files deemed critical data in the archival process. These same rules can be used on the client-level to include or exclude the files and directories that users select. The intelligent inclusion/exclusion rules utilize an inclusion and an exclusion list, which are consulted during the archival process to further reduce the amount of data archived and reduce network resources associated with the archival process.

51 Claims, 8 Drawing Sheets

SYSTEM AND METHOD FOR THE INTELLIGENT MANAGEMENT OF ARCHIVAL DATA IN A COMPUTER NETWORK

BACKGROUND OF THE INVENTION

I. Field of the Invention

The present invention relates generally to computer network management systems, and more specifically to the intelligent management of archival data in such networks.

II. Related Art

Given the current prevalence of personal computers (PCs), it is not uncommon for each employee in a company to have his or her own workstation for performing daily tasks such as word processing, CAD/CAM, creating spreadsheets, browsing the Internet, etc. Companies often employ computer networks to link these individual workstations for electronic mail communications, sharing data and resources (e.g., peripherals). These networks, for a medium to large size company, can easily contain over 10,000 workstations. Consequently, it is now necessary for companies to have a computer services or a management information systems (MIS) department.

These MIS departments are not only charged with maintaining and up-keeping the network but also with archiving the data located on the network. It is typical for MIS departments to perform full and incremental "nightly" back-ups (i.e., archiving) of the data located on each of the 10,000 or so computers on the network. Back-ups (also commonly referred to as "dumps") consist of spare copies of all the files on a computer workstation's disk which are made periodically and kept on magnetic tape or other removable storage medium. This essential precaution is needed, for example, in case an employee experiences a "disk crash" or accidentally deletes the only copy of a file containing critical data (e.g., a project file an employee has been working on for months).

As computer technology continues to advance at a rapid-fire pace, the data storage capacity, size of computer applications, and consequently, the size of user files are increasing dramatically. Thus, the task of performing back-ups is becoming increasingly complex. It is not uncommon for a computer network containing 10,000 computers to have two to four terabytes ($2^{40}$=1,099,511,627,776 bytes or roughly $10^{12}$ bytes) of data that needs to be archived during "full" back-ups and 350–400 gigabytes ($2^{30}$=1,073,741,824 bytes) of data that needs to be archived during nightly "incremental" back-ups. Even with the price of storage media (i.e., hard drives, magnetic tapes, CD-ROMs, etc.) decreasing and the capacity and speed of such media increasing, the costs in terms of time, labor, and supplies can be a significant amount of overhead for any company—at least $500,000 per year is not uncommon.

MIS departments (and computer scientists in general) have contemplated the problem of archiving large amounts of data and have developed several solutions. Many of these solutions have concentrated on faster computers or data compression techniques to minimize the amount of storage space archived data occupies. There are many compression algorithms and utilities such as compress (the standard UNIXô compression utility), gzip (written by the Free Software Foundation's GNU project), and pkzip (a product of PKware, Inc. primarily for MS-DOSô machines).

Another conventional scheme for dealing with the problem is reducing the amount of data needing to be backed-up on a regular basis. One such common scheme is known as the Grandfather-Father-Son (GFS) back-up scheme. In the GFS scheme, a full "grandfather" back-up is made at every pre-defined interval of time (e.g., monthly). A "Son" back-up is made one week later, archiving the data that has changed since the last "Grandfather" back-up. Finally, a "Father" back-up is made another week later to archive the data that has changed since the last "Son" back-up. The "Father-Son" process is then repeated until it is time for the next "Grandfather" back-up and the entire GFS process then repeats itself.

Another conventional back-up scheme to limit the amount of data needing to be archived is the use of an exclusion list. This scheme identifies pre-determined directories (e.g., application and operating system directories) which will not be archived from each user's workstation. This type of scheme results in redundant data not being archived. However, this scheme results in many lost files because users often are not savvy enough to know not to save files in these excluded directories. Furthermore, many programs often save special files (e.g., initialization or *.ini files) in these application and operating system directories. If these special files are not archived, a restoration process cannot reload them and thus a user's application preferences (e.g., mouse speed, screen color, Internet Web page bookmarks, etc.) are forever lost. This process can no doubt lead to a lot of frustration. In addition, none of the conventional compression techniques or backup schemes have addressed the amount of redundant data that is repeatedly archived.

What is needed, therefore, is a system and method for the intelligent management of archival data in a computer network where the resources and associated costs of making back-ups are reduced. Further, what is needed is a system and method that allows user's unique files to be archived regardless of what directory contains them through the creation and use of intelligent inclusion/exclusion lists and rules.

SUMMARY OF THE INVENTION

The present invention is a novel and improved system and method for intelligently managing data in the archival and restoration processes of a computer network. The system includes a plurality of computer workstations and a server which initiates and controls the archival process via an Inclusion/Exclusion engine. A set of rules which allows MIS personnel on the sever and users on the workstations to select the files and directories to include in or exclude from the archival process is included in the engine.

The engine makes use of an inclusion list that contains the signature of the files and directories included in the archival process based on the rules selected and applied. An exclusion list that contains the signature of the files and directories excluded from the archival process based on rules selected and applied is also included. The exclusion list also holds signatures of files deemed redundant data by the server.

The method of the present invention, during archiving, includes identifying a redundant file that is present in a pre-determined number of computer workstations, copying the redundant file to a low latency storage area, and updating a commonality list with the signature of the redundant file. The redundant file is then assigned a commonality list identification number which is placed into the archive as a placeholder. As for unique files present in the computer workstations, they are copied into the archive. The archive is then stored on a tape storage medium.

During restorations, when a placeholder (i.e., a commonality list identification number) is encountered in the archive, the file is located on the low-latency storage area using the commonality list identification number and then copied to the workstation being restored. When a unique file is encountered in the archive, it is copied directly from the archive to the computer workstation.

An advantage of the present invention is that not only can it speed-up the back-up process by eliminating redundant data, but the restoration process is sped-up as well.

Another advantage of the present invention is that, because less data is involved, the archival and restoration processes take up less network resources and leaves more bandwidth for regular computing activities.

Another advantage of the present invention is that, unlike conventional exclusion list, each computer workstation user within the network does not have to be aware of which directories files can or cannot be placed in.

Another advantage of the present invention is that new software applications installed on the network and then on individual workstations can automatically be labeled as redundant data and thus never be archived.

Yet still, another advantage of the present invention is that by eliminating the repeated archiving of redundant data, a company can reduce their MIS department's overall operational costs. Further features and advantages of the invention as well as the structure and operation of various embodiments of the invention are described in detail below with reference to the accompanying drawings.

BRIEF DESCRIPTION OF THE DRAWINGS

The features, objects, and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

I. Overview

The present invention is directed to the intelligent management of archival data within a computer network. In a preferred embodiment of the present invention, a corporation maintains a local area network (LAN) containing a server and a plurality (e.g., thousands) of computer workstations. The corporation employs a management information systems (MIS) department to perform full and incremental "nightly" back-ups of the data stored on the individual workstations. Due to the large amount of data (in the order of magnitude of several terabytes), these back-ups are made onto sets of magnetic tapes. When an employee experiences a disk crash, accidentally erases a critical file, or the like, a call is placed to the MIS department to restore the file(s) from the back-up tapes. The restoration process is time consuming because the file must first be located among the archival data stored among the sets of magnetic tapes used during the archival process.

The objective of the present invention is to intelligently manage the archival data of such a corporate LAN to greatly reduce the amount of data being archived and thus reduce the resources associated with the archival and restoration processes. While the present invention is described in terms of the above example, this is for convenience only and is not intended to limit its application. In fact, after reading the following description, it will be apparent to one skilled in the relevant art how to implement the following invention in alternative embodiments (e.g., in a wide area network (WAN)).

II. Computer Network Architecture

Figure 1:
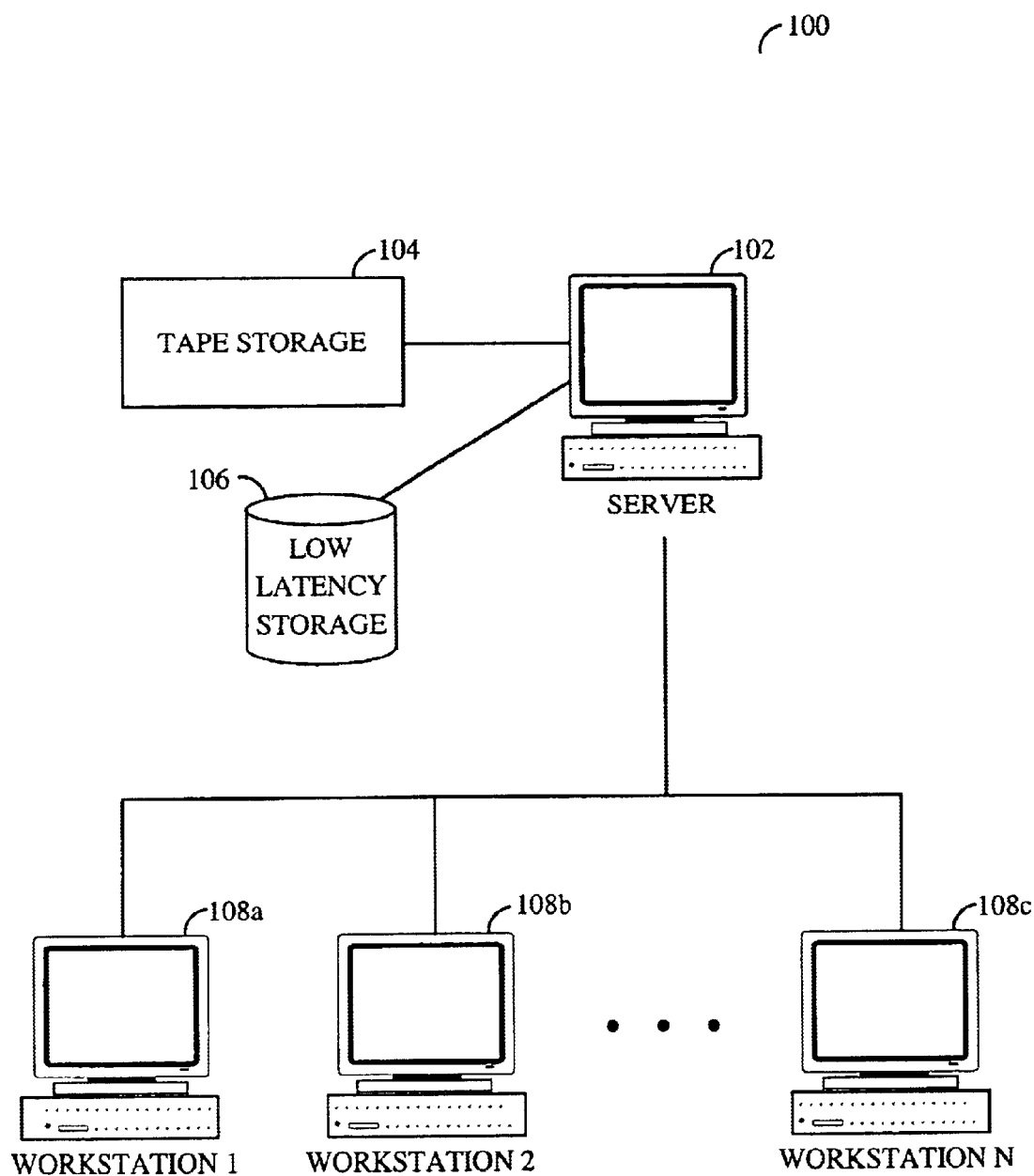
FIG. 1 is a block diagram of an exemplary computer network in which the present invention may be implemented.

FIG. 1 is a block diagram of an exemplary computer network 100 in which the present invention may be implemented. FIG. 1 represents a conventional corporate LAN. Network 100 is a client-server network scheme which contains a server 102 and a plurality of workstations 108 (shown as workstations 108a–108n) which are collectively the "clients." In a preferred embodiment, the server 102 and workstations 108 are IBMô compatible personal computers (PCs) running the Windows 95ô or Windows NTô operating system and connected via an Ethernet LAN.

In an alternative embodiment, sever 102 would be a Sun Enterpriseô 3000 server connected to Sun Ultraô 5 workstations 108 via an Ethernet LAN and running the Solarisô (Sun's Unix) operating system. Many other LANs, whether in a star, ring or shared bus configuration, such as a Fiber Distributed Data Interface (FDDI) LAN or a token ring LAN, which are well known in the relevant art, are also contemplated.

Returning to FIG. 1, a tape storage medium 104 and a low latency storage medium 106 are also connected to the server 102. Tape storage medium 104 (e.g., magnetic tape or the like) is commonly used to store a computer network's archival data due to its large capacity and relatively low cost. The low latency storage medium 106 can be a hard drive, magneto-optical device, CD-ROM or the like. These low latency storage devices, as their name suggests, provide high-speed access to data but at a more significant cost. Thus it is the goal of the present invention to store only the most commonly used data in the low latency storage medium 106 for high speed access during restorations and to store all other data on magnetic tapes or the like via tape storage medium 104.

Although an exemplary environment for the present invention describes only two layers (i.e., client and server), alternative embodiments of network 100 having a plurality of layers are contemplated by the present invention. For example, although only one server workstation 102 is shown for ease of explanation, other client-sever configurations are also equally suitable to the implementation of the present invention. Also, while storage medium 104 is described as a tape storage medium, it is readily apparent that any other medium satisfying the requirements of larger volume, relatively low cost storage can be used.

III. The Nature of Data within Network 100

In order for the present invention to allow the intelligent management of archival data, the nature of the data located within computer network 100 must first be characterized. Data located on the workstations 108 can typically be characterized as (1) common files; (2) unique data; and (3) unique garbage. First, common files are application files (e.g., word processors, spreadsheets, etc.) and operating system files that have been installed on all of the workstations 108. Because archiving this data from each of the plurality of workstations 108 results in wasted storage medium and network bandwidth resources, these files can be labeled as redundant data in accordance with the present invention. Second, unique data encompasses files that an individual user has created on their workstation 108 (e.g., myreport.doc, vacationpay.zip, etc.). Third, unique garbage encompasses files created temporarily by the operating system or an application program (e.g., pagefile.sys, C:\Netscape\Cache\*.gif). Given these classifications, it will be apparent to one skilled in the relevant art how the files found in a computer network, such as network 100, would be classified. These classifications would be based on the idiosyncracies of the network such as the particular operating system in use and the application programs installed on the workstations 108.

IV. Back-up Scheme Architecture

A. The First Full Back-up

Figure 2:
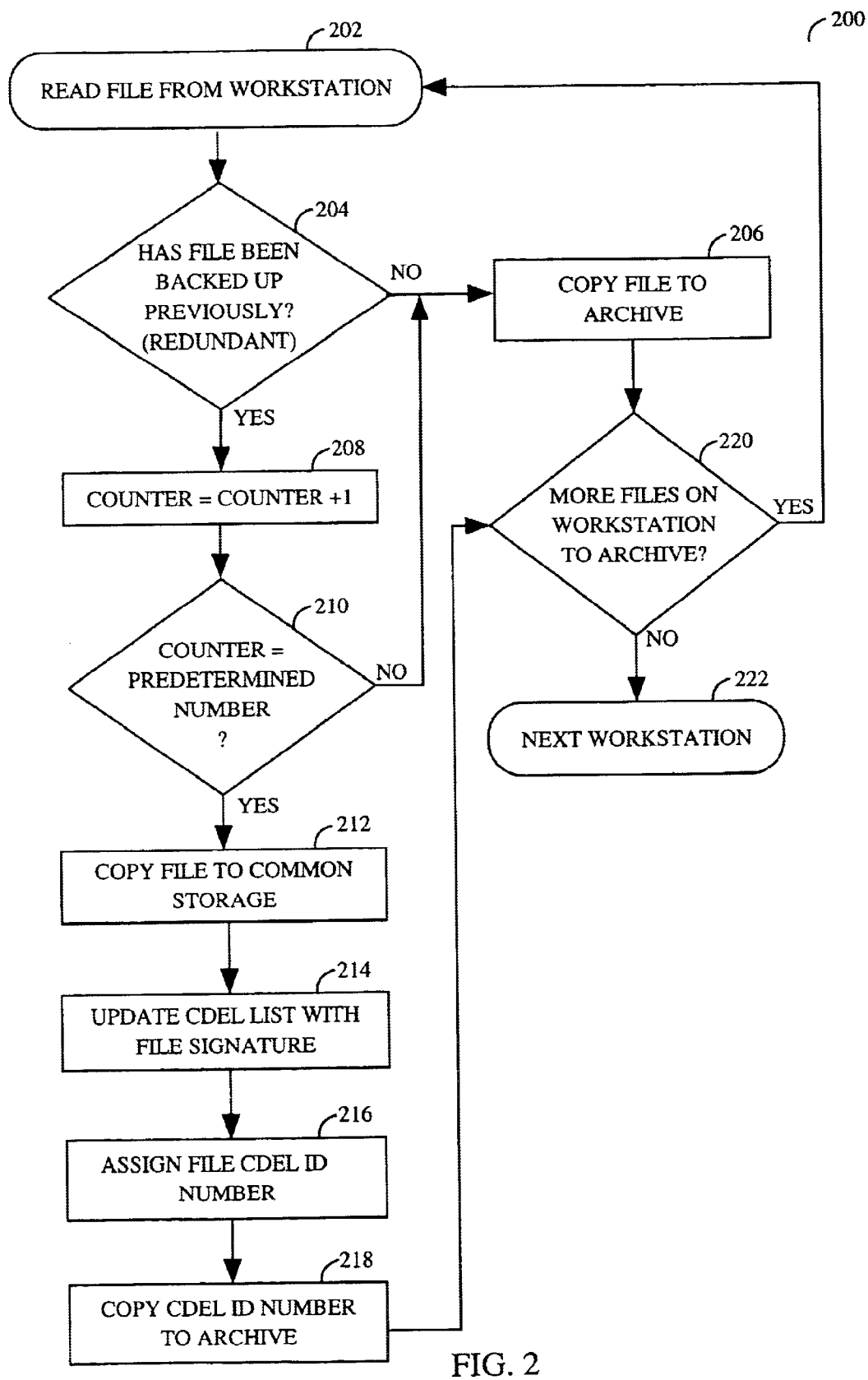
FIG. 2 is a flowchart illustrating an initial archival procedure according to a preferred embodiment of the present invention.

FIG. 2 shows a flowchart illustrating an initial archival operation 200 according to the present invention. Archival operation 200 begins at step 202 where a file is read from the first workstation 108 (e.g., 108a) being backed-up in the archival process of network 100. In step 204, the archival operation 200 determines if the file has been previously archived using the file's signature. (A file's signature is explained in detail below with reference to FIG. 4.) If the file signature is not recognized as being common to a predetermined number of workstations 108, then the file is copied to the archive (i.e., tape storage 104) in step 206. In step 220, archival operation 200 determines if there are more files to archive on the workstation 108a. If yes, the next file is read from workstation 108a in step 202. Steps 202–220 are repeated until there are no more files to be archived in workstation 108a. The archival operation 200 then moves to the next workstation 108 (e.g., 108b) as indicated by step 222. Returning to step 204, if a file read in step 202 is determined to have been archived previously, a counter is increased by one at step 208. In step 210, the counter is checked to see if it is equal to or greater than the pre-determined number. If yes, step 212 copies the file to a common storage area located on the low latency storage medium 106. In step 214 a server dictated commonality exclusion list ("CDEL list") is created and updated with the signature of the redundant file. In step 216, the redundant file is assigned a CDEL identification number and, in step 218, the CDEL identification number is placed into the archive (i.e., tape storage 104) instead of the redundant file. By placing the CDEL identification number, rather than the actual file, into the archive, the space which archival data occupies is greatly reduced. The archival operation then proceeds to step 220 as described above.

Figure 3:
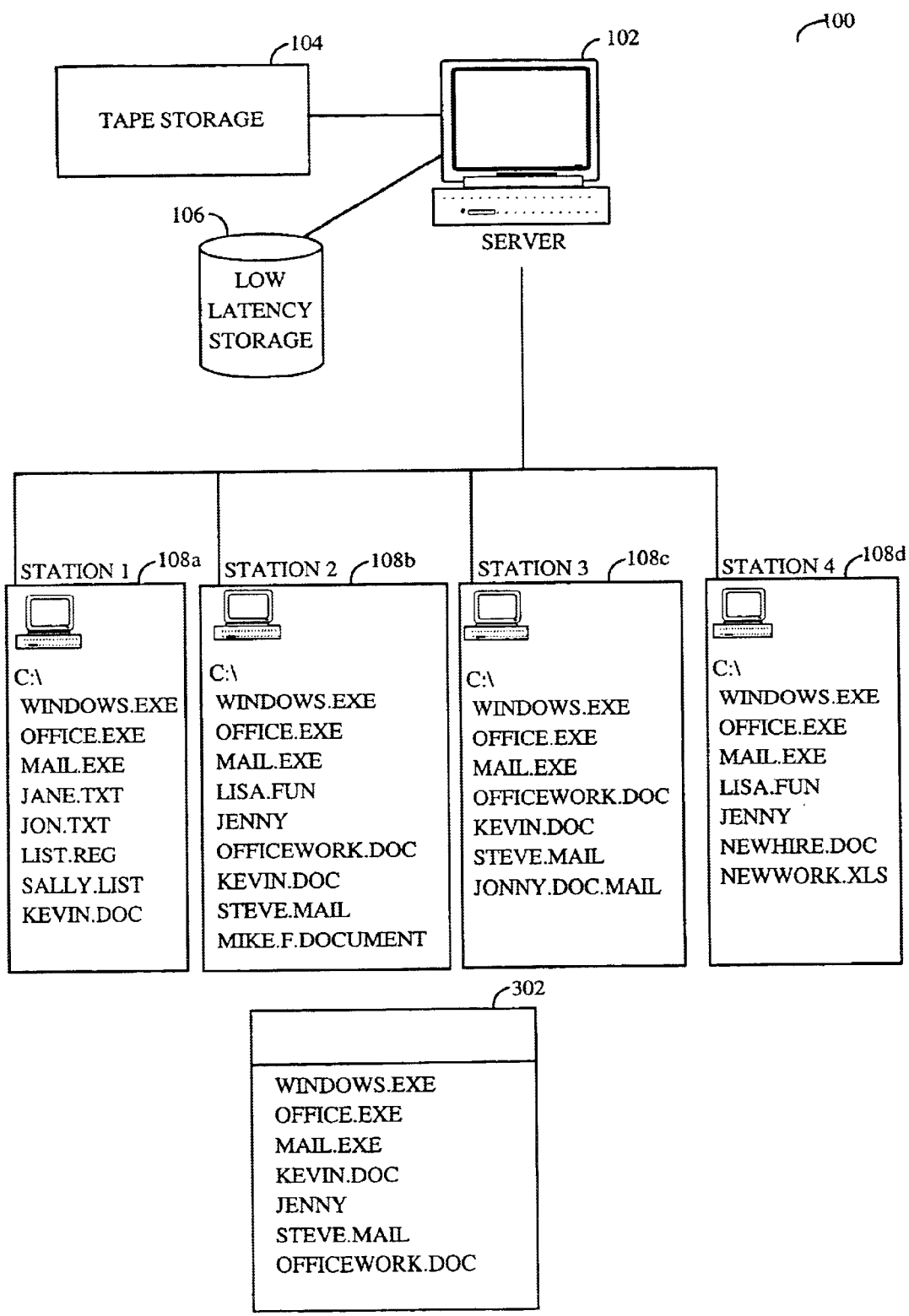
FIG. 3 is a diagram illustrating a commonality ("CDEL") list according to a preferred embodiment of the present invention.

FIG. 3 illustrates a block diagram of network 100 after the initial archival operation 200. A CDEL list 302 contains the names of all the files that are common to at least the pre-determined number of workstations 108a–d. Those files are stored on the low latency storage medium 106 according to archival operation 200 (i.e., step 212 as shown in FIG. 2). In a preferred embodiment, the CDEL list 302 is stored on server 102 where each workstation 108 can access it during archival operation 200. In an alternative embodiment, the CDEL list 302 can be stored locally on each of the workstations 108 or on server 102. In this latter embodiment, the server 102 would provide an updated version of the CDEL list 302 periodically (e.g., monthly or weekly) to each of the workstations 108.

FIG. 3 assumes a pre-determined number of 2. That is, a file's signature is not placed on the CDEL list 302 unless it appears on 2 or more of the workstations 108 within network 100. The pre-determined number, say N, indicates that if a file is located on at least N workstations 108 within network 100, it does not need to be archived every time it is encountered. For example, if network 100 contained 10,000 workstations 108, MIS personnel could select a pre-determined number of N=100. Thus if a file appeared on at least 100 workstations 108, its signature would be placed on the CDEL list 302, it would be stored on the low latency storage medium 106, and it would not be archived to tape or other storage medium 104 every time one of the at least 100 workstations 108 which contained the file is backed-up.

B. Selecting the Pre-determined Number

The pre-determined number selected by the MIS department to be used in the initial archival operation 200 is based on the idiosyncracies of the network MIS personnel would select the pre-determined number based on such factors as the number of workstations 108 in the network 100, the storage capacity of the low latency storage medium 106, the characteristics of the users and data on workstations 108, etc.

The smaller the pre-determined number, the larger the amount of data that is going to be stored in the common area (i.e., the low latency storage medium 106). Therefore, the key to selecting the pre-determined numbers is to keep increasing it until the decrease in size of the common area results in a proportional reduction in the amount of archival data. In other words, the predetermined number would be increased until the cost of having to archive more data is greater than the savings realized in decreasing the size of the common storage area located on the low latency storage medium 106 (i.e., until the point of diminishing return is reached).

For example, experiments conducted in a corporate network 100 having 3,500 IBMô compatible PCs (i.e., workstations 108) with Pentiumô processors, running the Windows NTô operating system and connected via an Ethernet LAN have resulted in the data presented in Table 1.

TABLE 1

| (1) Pre-determined Number (N) | (2) Size of Redundant Data Stored to Low Latency Storage 106 | (3) Space Redundant Data Occupies on Workstations 108 |
| --- | --- | --- |
| 2 | 20,632,206,114 | 1,219,740,977,563 |
| 3 | 11,183,145,544 | 1,200,842,856,423 |
| 5 | 8,297,156,484 | 1,190,280,795,902 |
| 10 | 5,939,609,139 | 1,174,731,243,323 |
| 15 | 4,722,313,195 | 1,160,634,216,191 |
| 25 | 3,332,633,835 | 1,135,240,519,991 |
| 50 | 2,488,265,904 | 1,105,105,219,092 |
| 100 | 1,719,273,940 | 1,051,314,500,444 |

TABLE 1-continued

| (1) Pre-determined Number (N) | (2) Size of Redundant Data Stored to Low Latency Storage 106 | (3) Space Redundant Data Occupies on Workstations 108 |
| --- | --- | --- |
| 200 | 954,230,631 | 946,541,106,537 |
| 300 | 598,592,717 | 858,675,953,478 |
| 400 | 440,595,650 | 802,929,822,523 |

Column (1) lists the values of the pre-determined number, N, selected by the MIS personnel during each experiment. Column (2) lists, after archival operation 200, the size (in bytes) of the data stored to the common storage area located on the low latency storage medium 106. (In the experiments, a PC's high-speed hard disk drive was used as the low latency storage medium 106.) Column (3) lists the number of bytes the redundant files on low latency storage medium 106 occupy on the workstations 108. Consequently, column (3) represents the savings, measured in terms of amount of data not needing to be archived in subsequent back-ups, resulting from archival operations performed according to the present invention.

C. Determining Data Redundancy (Using File Signatures)

Referring to step 204 of FIG. 2, the initial archival operation 200 determines whether a file has been previously archived. Step 204 essentially determines whether a file contains data that is unique to that particular workstation 108 or contains data that is common to at least the pre-determined number of workstations 108. This process involves comparing the current file under determination with the file signatures on the CDEL list 302.

A file's signature is a data structure composed of its: (1) file name; (2) file size; (3) creation date; (4) creation time; and (5) a checksum calculated using the contents of the file itself. Because a file named "report.doc" may appear on several workstations 108 with the same creation date, the use of the checksum in data redundancy determinations (as will be shown in FIG. 4) ensures to a very high certainty that two files being compared actually contain redundant data. In a preferred embodiment, the checksum, computed by summing the bytes or words of a data block while ignoring overflow, will be a 32-bit value. The use of a checksum for data verification is well known in the relevant art. Furthermore, it would be apparent to one skilled in the relevant art how to calculate a file's checksum depending on the operating system(s) in use within computer network 100.

Figure 4:
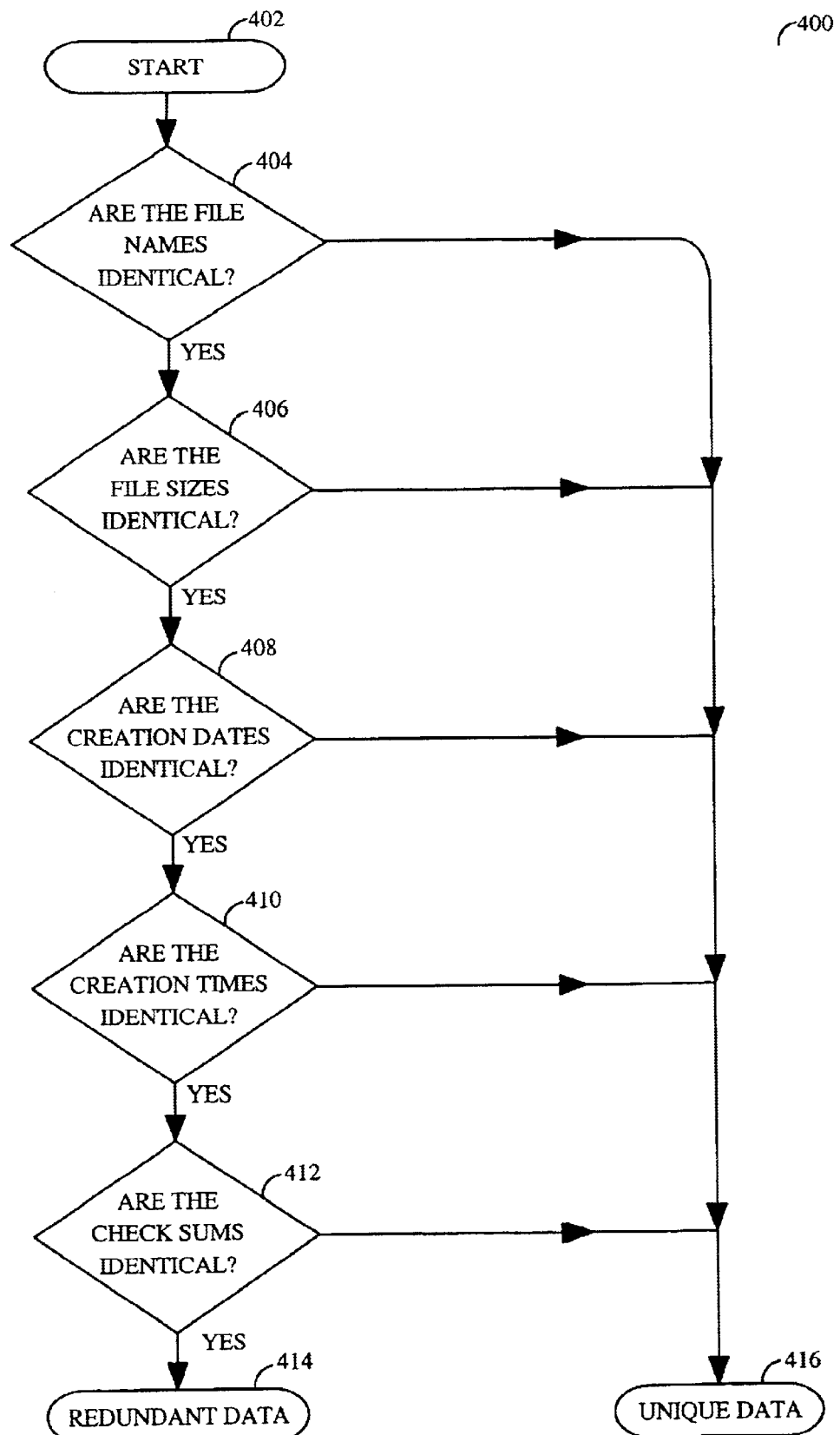
FIG. 4 is a flowchart illustrating a data redundancy determination procedure performed according to a preferred embodiment of the present invention.

FIG. 4 illustrates a flowchart of a determination process 400 performed by step 206 of the initial archival operation 200. Determination process 400 begins at step 402 with control passing immediately to step 404. In step 404, the determination process 400 compares the name of the current file under determination with the file name component of the file signatures on the CDEL list 302. Then, the size (step 406), the creation date (step 408), the creation time (step 410), and finally the checksum (step 412) of the file under determination are compared with the corresponding components of the file signature data structures on the CDEL list 302. Should all the checks (i.e., steps 404–412) succeed, the file is determined to contain redundant data not needing to be archived at step 414. If any of the checks should fail, the file is determined to contain unique data needing to be archived at step 416.

D. Subsequent Incremental Back-ups

Figure 5:
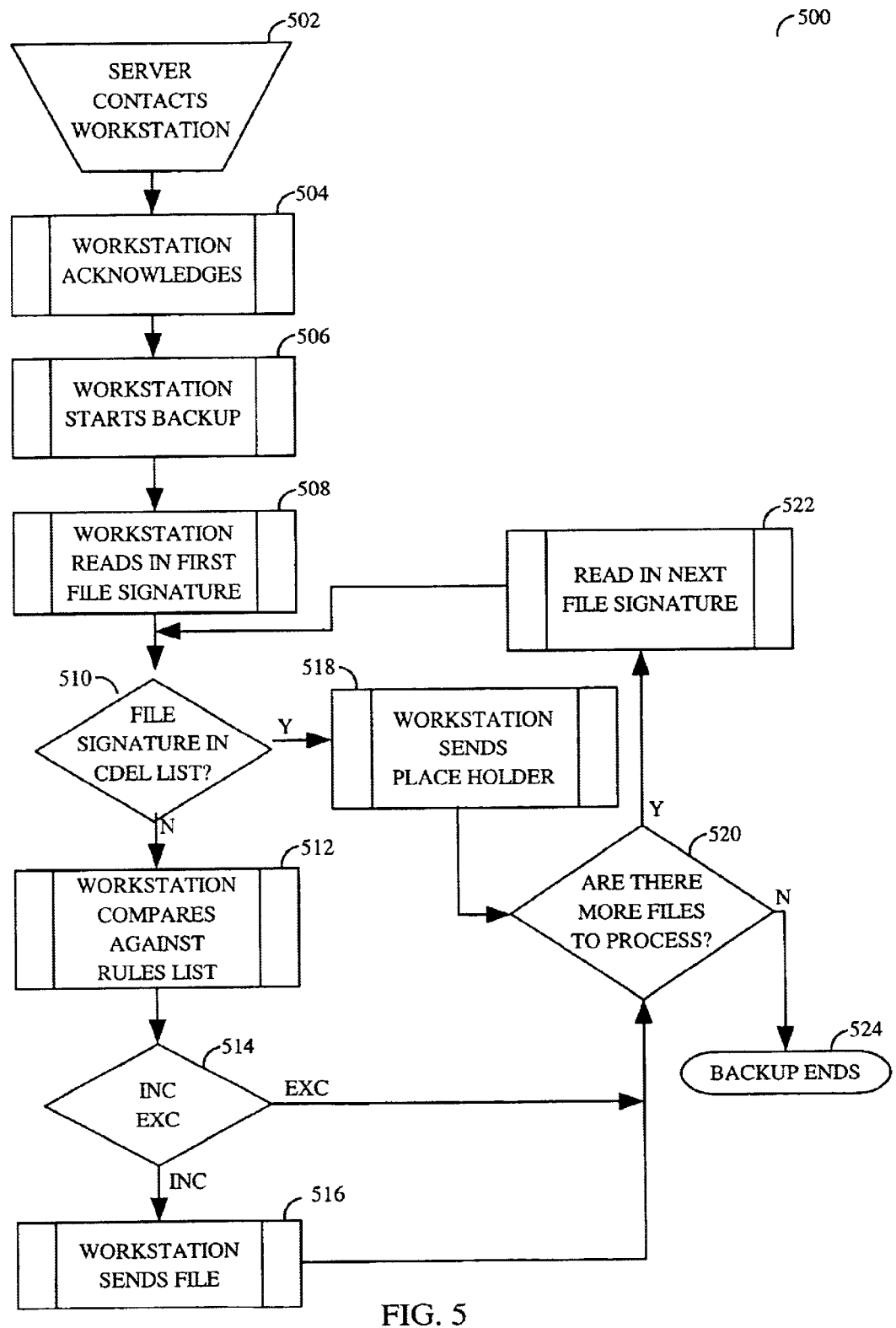
FIG. 5 is a flowchart illustrating the overall archival procedure of the present invention.

Referring to FIG. 5, a flowchart illustrating the overall archival procedure 500 of the present invention's subsequent (e.g., nightly) back-ups is shown. Archival procedure 500 begins at step 502 with the server 102 contacting one of the plurality of workstations 108 to initiate the back-up process. In step 504, the workstation 108 acknowledges the initiation of the server 102 and begins the back-up at step 506. In step 508, a file is read from the workstation 108 and its signature is calculated. In step 510, archival procedure 500 determines whether the file is on the CDEL list 302. In step 518, if the file's signature is on the CDEL list 302, the workstation 108 sends the file's CDEL identification number to the server 102 as a placeholder rather than the actual file itself.

In step 520, the archival procedure 500 determines whether there are more files to be archived from workstation 108. If not, archival procedure 500 ends for that particular workstation 108 at step 524. If there are more files to be archived, step 522 reads in the next file and then steps 510–522 are repeated.

Returning to step 510, if the file's signature is not on the CDEL list 302, steps 512–514 are performed before deciding whether to send the file to server 102 for archiving. Steps 512–514 incorporate the inclusion/exclusion lists and rules intelligence as explained in detail below with reference to Sections VI–VII and FIG. 7.

Although an exemplary embodiment of the present invention describes one CDEL list 302, a selection of one pre-determined number, and one common storage area for redundant data located on the low latency storage medium 106, alternative embodiments are contemplated by the present invention. For example, the plurality of computer workstations 108 in network 100 can be divided into "back-up sets" (e.g., 10 sets of 1000 workstations). Each back-up set would then have their own CDEL list 302, common storage area for storing redundant data located on a separate low latency storage medium 106, utilize a different selected pre-determined number and even have different server dictated inclusion/exclusion list intelligence.

V. Restoration Scheme Architecture

Figure 6:
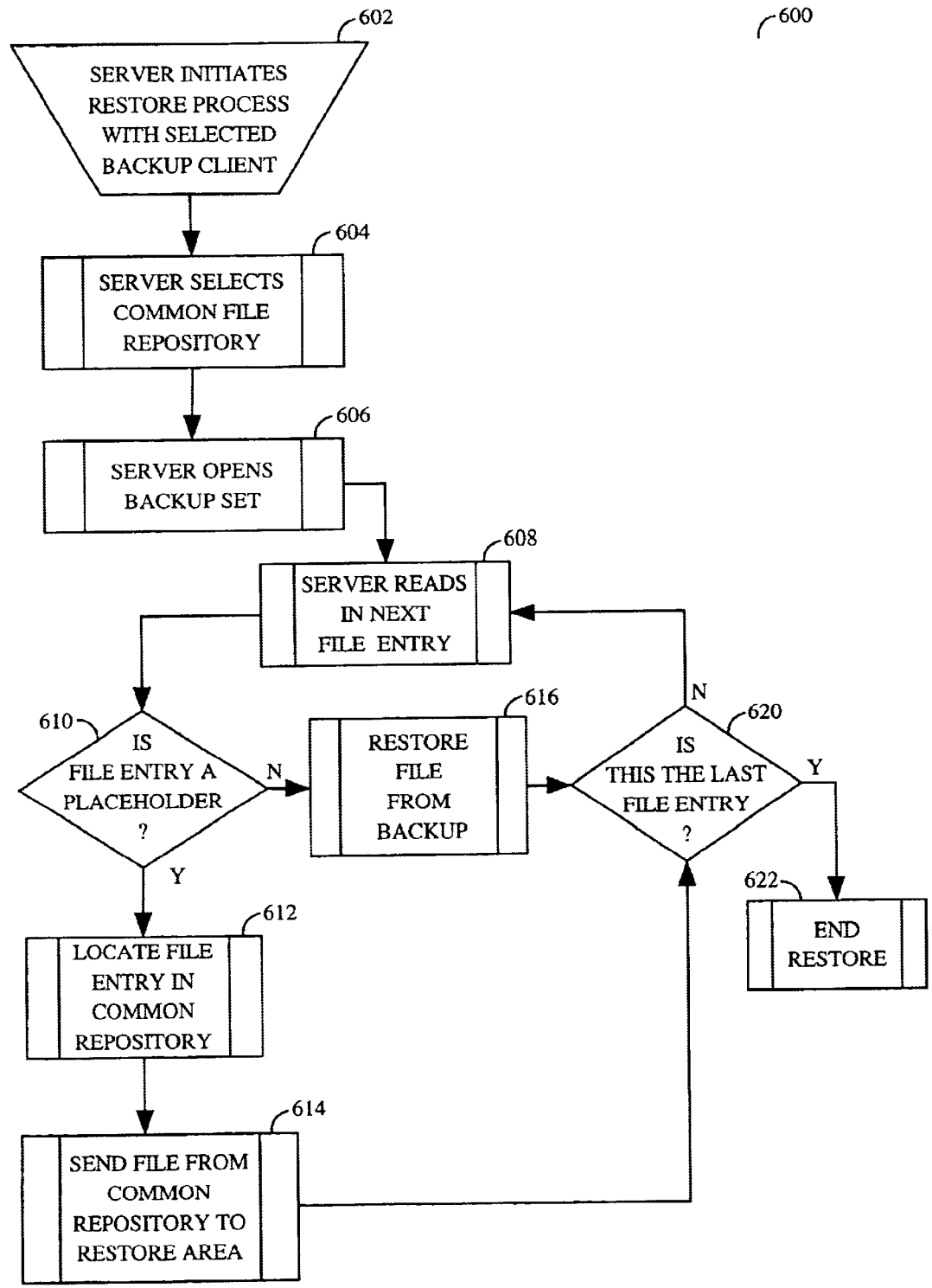
FIG. 6 is a flowchart illustrating the overall restoration procedure of the present invention.

Referring to FIG. 6, a flowchart illustrating the overall restoration procedure 600 of the present invention is shown. Restoration procedure 600 begins at step 602 with the server 102 contacting one of the plurality of workstations 108 to initiate the restoration process. In step 604, the server 102 selects the corresponding common file repository (i.e., common storage area located on the low latency storage medium 106). In step 606, the server then opens the corresponding back-up set in the archive storage area (i.e., a set of archive tapes located on tape storage medium 104).

In step 608, server 102 reads an entry from the archive. In step 610, restoration procedure 600 determines if the entry is a placeholder (i.e., a CDEL identification number) or an actual file. If the entry is an actual file, the file is restored to the workstation 108 at step 616. If the entry is a placeholder, the file is located on the common storage area located on the low latency storage medium 106 at step 612. The file is then restored to the workstation 108 in step 614. Steps 608–616 repeat until the entire archive is read and restored as determined by step 620. Restoration procedure 600 then ends at step 622.

VI. Exclusion Intelligence

The present invention's intelligent management of archival data not only deals with redundant data but also allows MIS personnel, as well as individual users of the workstations 108, to further reduce the amount of data being archived. In a preferred embodiment of the present invention, inclusion/exclusion lists and rules intelligence is built into the archival procedure 500 as shown in steps 512–514 of FIG. 5.

The inclusion/exclusion lists and rules intelligence allow flexibility in determining which files to back-up and which to ignore, without overwhelming the individual users of the workstations 108 with complexity. The present invention contemplates software with a graphical user interface (GUI) or the like to allow workstation 108 users and MIS personnel to manipulate the inclusion/exclusion lists and rules intelligence. The software would run on each of the plurality of workstations 108 to allow individual users to select which files to back-up on their individual machines. The same software would also run on the server 102 to allow MIS personnel to select which files to back-up on the client machines. In a preferred embodiment, the software would provide the GUI within an application program running on top of the operating system of the workstations 108 and server 102. In an alternative embodiment, a Hypertext Markup Language (HTML) corporate intranet web page would provide a GUI interface, through a commercial browser, to the software.

A. Intelligent Inclusion/Exclusion Rules

A series of rules can be defined to delineate a file set and then specify the action (i.e., exclude or include) to be taken with respect to the file set during archival procedure 500 (i.e., steps, 512–514). The file set specified by the rules may contain one file, several files, or no files. In a preferred embodiment of the present invention, 25 rules are defined using four component characteristics. The characteristics are: (1) Source; (2) Scope; (3) Direction; and (4) Type. These four characteristics combine to form a rule as follows:

Rule: <Source> <Scope> <Direction> <Type>.

The Source characteristic indicates whether a rule is a client-level rule (i.e., may be utilized by users on the workstations 108) or a server-level rule (i.e., may only be utilized by MIS personnel on server 102). The Scope characteristic determines if the rule applies to an explicitly named file or a group of files defined using a wildcard (e.g., "report?.doc" or "*.doc"). The Direction characteristic indicates whether a rule includes or excludes the file set during archival procedure 500 (i.e., step 514 of FIG. 5). Finally, the Type characteristic indicates whether a rule applies to files in a single directory, to files in a directory sub-tree, or to all files on a given workstation 108 (i.e., global). The different values that each of the four characteristics can take on are summarized in Table 2.

TABLE 2

| Rule Component Characteristic | Possible Values |
| --- | --- |
| 1. Source: | Client |
| | Server |
| 2. Scope: | Explicit File |
| | Wildcard |
| 3. Direction: | Include |
| | Exclude |
| 4. Type: | File |
| | Directory |
| | Global |

Thus, the possible values of the four characteristics (i.e., permutations) allow twenty-four different rules (2*2*2*3= 24) to be defined. Also, in a preferred embodiment, a twenty-fifth rule is defined as an "Always Include" rule which is a special rule provided to MIS personnel for use on the server 102.

These twenty-five rules are used in archival procedure 500 (i.e., step 512 as shown in FIG. 5) to further reduce the amount of data archived during each back-up. However, it is important to note that in alternative embodiments, it is not necessary for archival procedure 500 to utilize all twenty-five of the exemplary rules in order to properly operate.

The twenty-five rules defined for archival procedure 500 can be divided into thirteen exemplary categories. The first category contains solely the special "Always Include" rule. The other twelve categories stem from the permutations of three of the characteristics (ignoring the fourth, Direction, characteristic). That is, the possible values for the Source, Scope, and Type characteristics form the other twelve categories (2*2*3=12). Thus, a total of thirteen categories are identified and described in Table 3.

TABLE 3

| Category (<Source> <Scope> <Type>) | Description |
| --- | --- |
| "Always Include" | The special rule is server defined and applies to an explicit file name on all of the workstations 108 within network 100. |
| Sever Explicit File | An inclusion or exclusion rule in this category will refer to a single fully qualified file name |
| Server Wildcard File | An inclusion or exclusion rule in this category will refer to a set of files in a given directory |
| Client Explicit File | An inclusion or exclusion rule in this category will refer to a single fully qualified file name |
| Client Wildcard File | An inclusion or exclusion rule in this category will refer to a set of files in a given directory |
| Server Explicit Directory | An inclusion or exclusion rule in this category will refer to all files in a given directory tree |
| Server Wildcard Directory | An inclusion or exclusion rule in this category will refer to a subset of the files in a directory tree |
| Client Explicit Directory | An inclusion or exclusion rule in this category will refer to all files in a given directory tree |
| Client Wildcard Directory | An inclusion or exclusion rule in this category will refer to a subset of the files in a directory tree |
| Server Explicit Global | An inclusion or exclusion rule in this category will refer to all occurrences of a given file on a workstation 108 |
| Server Wildcard Global | An inclusion or exclusion rule in this category will refer to all occurrences of a set of files on a workstation 108 |
| Client Explicit Global | An inclusion or exclusion rule in this category will refer to all occurrences of a given file on a workstation 108 |
| Client Wildcard Global | An inclusion or exclusion rule in this category will refer to all occurrences of a set of files on a workstation 108 |

Naturally, when dealing with the thirteen categories of rules, some selected and applied at the client-level (108) and some at the server-level (102), conflicts will arise. Thus, in a preferred embodiment, priority levels are assigned to each rule category to resolve these conflicts. An exemplary priority level assignment for the thirteen categories of rules is shown in Table 4 with level 5 priority being the highest priority.

TABLE 4

| Priority Level | Member Categories |
| --- | --- |
| 5 | "Always Include" |
| | Sever Explicit File |
| 4 | Client Explicit File |
| | Server Wildcard File |
| | Server Explicit Global |
| 3 | Client Wildcard File |

TABLE 4-continued

| Priority Level | Member Categories |
| --- | --- |
|  | Server Explicit Directory |
|  | Server Wildcard Global |
| 2 | Client Explicit Directory |
|  | Server Wildcard Directory |
|  | Client Explicit Global |
| 1 | Client Wildcard Directory |
|  | Client Wildcard Global |

In determining the priority level assignments listed in Table 4, the following considerations are used: (1) where two rules conflict only in the Source characteristic (i.e., client or server), the server rule has the highest priority, (2) where two rules conflict in the Direction characteristic (i.e., include or exclude), the inclusion rule has the highest priority; (3) where two rules conflict in the Scope characteristic (i.e., explicit or wildcard), the explicit rule has the highest priority; and (4) file rules have higher priority over directory rules. Furthermore, among two rules in the same priority level, the Direction characteristic is used as a tiebreaker keeping in mind that the special "Always Include" rule has the highest priority among priority level 5.

B. Intelligent Inclusion List

The present invention also allows the intelligent management of archival data in computer network 100 through the use of an intelligent inclusion list. The inclusion list, created by utilizing the exemplary inclusion rules defined above, forces archival procedure 500 (at step 514 as shown in FIG. 5) to always back-up certain files that the sever 102 deems as critical. These critical files will be archived each night regardless of whether they have changed or whether an individual user has selected to exclude it through one of the exclusion rules. The inclusion list ensures company critical files are redundantly archived thus increasing the safety of critical data.

The inclusion list also allows MIS personnel to include files which may not be company critical files, but which experience has shown to be the most frequently requested files for MIS to restore (e.g., *.ini files). In a preferred embodiment, files found in the inclusion list are stored on the low latency storage medium 106 allowing easy and quick restorations thereby decreasing the time a user must wait for MIS to restore the file to their workstation 108.

C Intelligent Exclusion List

The present invention further allows the intelligent management of archival data in computer network 100 through the use of an intelligent exclusion list created by utilizing the exclusion exemplary rules defined above. The exclusion list allows clients (workstations 108) to skip over files during archival procedure 500 that would normally have been sent to the server 102 during each back-up. This greatly reduces the amount of data archived by eliminating files that are easily reproduced (e.g., files for word processors, spreadsheets, the operating system, etc.). In an alternate embodiment, the CDEL list 302 also serves as the intelligent exclusion list as part of archival procedure 500 (i.e., step 512 as shown in FIG. 5). In this way, new software applications installed on network 100 and on the individual workstations 108 can automatically be placed on the exclusion list and thus never be archived in the first subsequent backup.

VII. The "Inclusion/Exclusion" Engine

Figure 7:
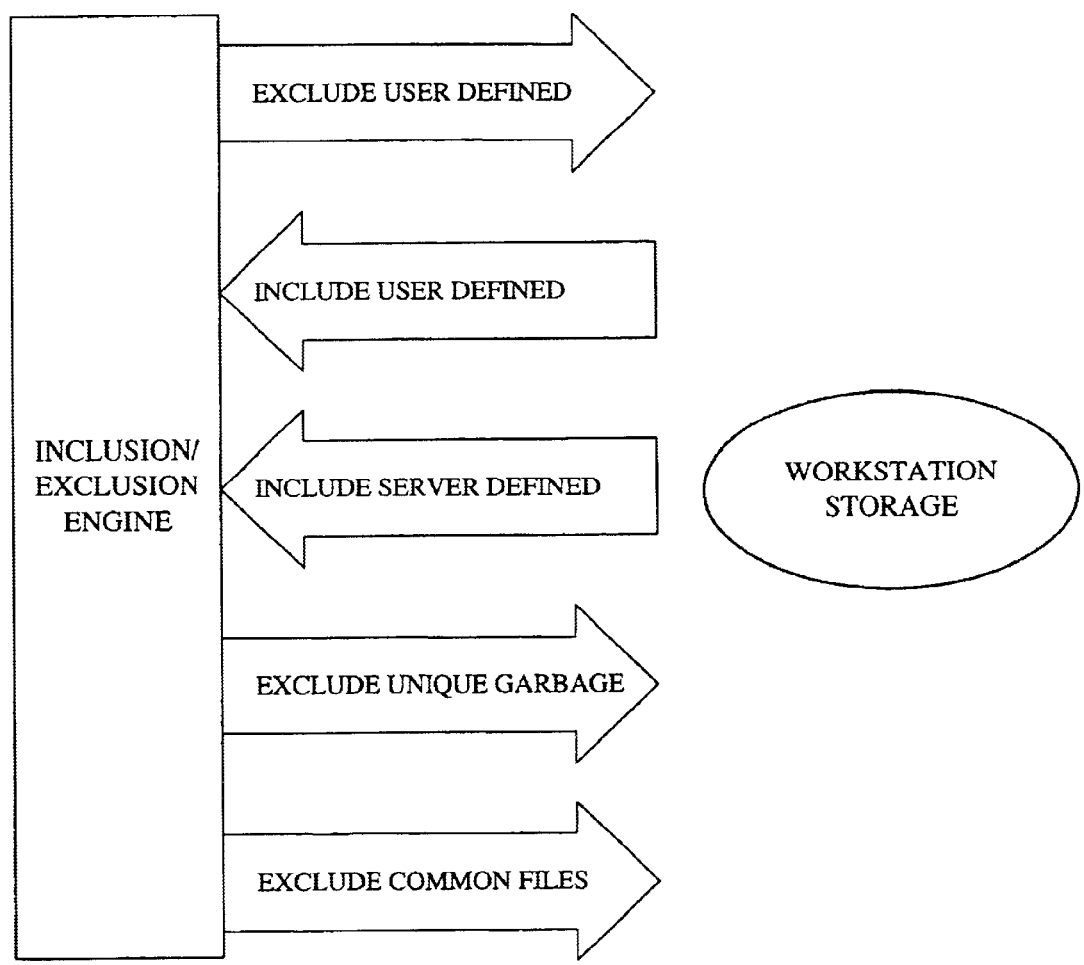
FIG. 7 is a diagram illustrating an "Inclusion/Exclusion Engine" of the present invention.

In a preferred embodiment, archival operation 200, archival procedure 500, the exemplary inclusion/exclusion rules, and the inclusion and exclusion lists of the present invention function together as an "Inclusion/Exclusion Engine." The result is a system and method that intelligently manages archival data by: (1) excluding, from the archival process, all files that are redundant data (e.g., operating system and application files); (2) excluding all files the server dictates as unique garbage (e.g., pagefile.sys); (3) excluding all files and directories that the users select (e.g., c:\mydocs\temp); (4) including all files and directories that users select (e.g., c:\mydocs\temp\critical.doc); and (5) including all files that the server dictates as critical data (e.g., C:\Programs\Netscape\Bookmark.html). This overall "Inclusion/Exclusion Engine" operation of the present invention is shown in FIG. 7.

VIII. Environment

Figure 8:
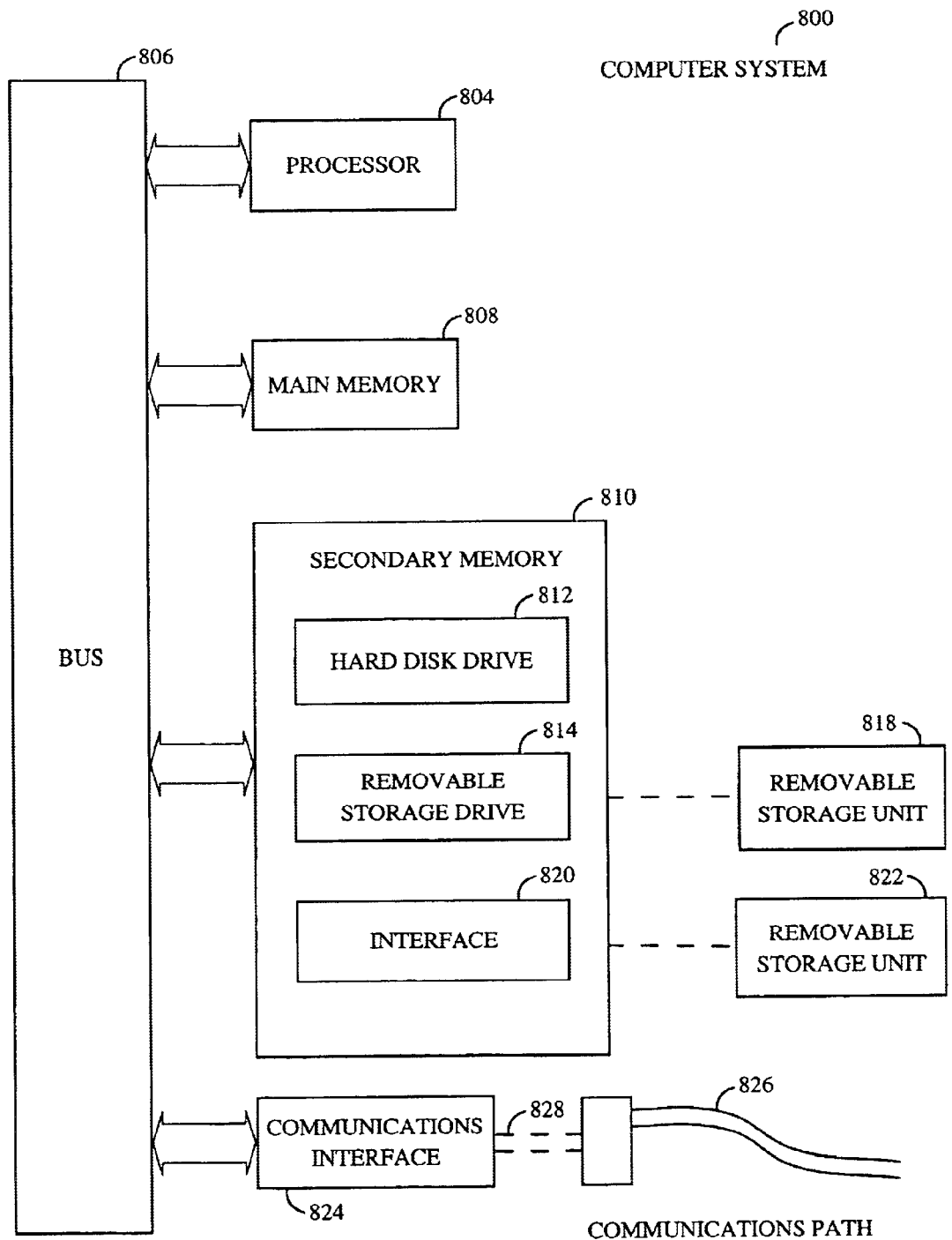
FIG. 8 is a block diagram illustrating an exemplary computer for implementing the present invention.

The present invention (i.e., the "Inclusion/Exclusion Engine" or any part thereof) may be implemented using hardware, software or a combination thereof and may be implemented in a computer system or other processing system. In fact, in one embodiment, the invention is directed toward a computer system capable of carrying out the functionality described herein. An example of a computer system 800 is shown in FIG. 8. The computer system 800 includes one or more processors, such as processor 804. The processor 804 is connected to a communication bus 806. Various software embodiments are described in terms of this example computer system. After reading this description, it will become apparent to a person skilled in the relevant art how to implement the invention using other computer systems and/or computer architectures.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means can include, for example, a removable storage unit 822 and an interface 820. Examples of such can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 can also include a communications interface 824. Communications interface 824 allows software and data to be transferred between computer system 800 and external devices. Examples of communications interface 824 can include a modem, a network interface (such as an Ethernet card), a communications port, a PCM-CIA slot and card, etc. Software and data transferred via communications interface 824 are in the form of signals 828 which can be electronic, electromagnetic, optical or other signals capable of being received by communications interface 824. These signals 828 are provided to communications interface 824 via a communications path (i.e., channel) 826. This channel 826 carries signals 828 and can be implemented using wire or cable, fiber optics, a phone line, a cellular phone link, an RF link and other communications channels.

In this document, the terms "computer program medium" and "computer usable medium" are used to generally refer to media such as removable storage drive 814, a hard disk installed in hard disk drive 812, and signals 828. These computer program products are means for providing software to computer system 800.

Computer programs (also called computer control logic) are stored in main memory 808 and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IX. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for intelligently managing data while creating an archive of computer workstations in a computer network, comprising the steps of:
   (1) creating a signature of a file;
   (2) determining whether said file is a redundant file present in a pre-determined number of computer workstations within the computer network based on said signature; and
   (3) if said file is a redundant file, then:
      (a) copying said redundant file to a common storage area;
      (b) updating a commonality list with said signature of said redundant file;
      (c) assigning said redundant file a commonality list identification number; and
      (d) placing said commonality list identification number, but not said redundant file, into an archive storage area which is separate and distinct from said common storage area.

2. The method of claim 1, further comprising the step of:
   (4) determining whether said file is a unique file present on one of the computer workstations within the computer network based on said signature and copying said unique file into said archive storage area.

3. The method of claim 1, wherein step (1) comprises the steps of:
   (a) creating a data structure containing the name, size, creation date, and creation time of said file;
   (b) creating a checksum based on the name, size, creation date, and creation time of said file; and
   (c) placing said checksum into said data structure.

4. The method of claim 3, further comprising the steps of:
   (4) determining when said signature of said redundant file has been previously encountered more than said pre-determined number of times; and
   (5) determining whether said signature of said redundant file is already on said commonality list to ensure said redundant file is placed on said commonality list, copied to said common storage area, and assigned a commonality list identification number only once.

5. The method of claim 1, wherein said common storage area comprises a low latency, high-speed storage medium.

6. The method of claim 1, wherein said archive storage area comprises a magnetic tape storage medium.

7. The method of claim 1, wherein said commonality list is stored on a common storage area in the computer network.

8. The method of claim 7, further comprising the step of copying said commonality list onto each of the computer workstations in the computer network.

9. The method of claim 2, further comprising the steps of:
   (5) dividing the plurality of computer workstations into a plurality of back-up sets;
   (6) assigning a common storage area, a commonality list and a pre-determined number to each of said plurality of back-up sets.

10. The method of claim 1, further comprising the steps of:
    (4) directly placing the signature of a new file on said commonality list, wherein said new file is known to be present in at least said pre-determined number of the computer workstations; and
    (5) assigning said new file a commonality list identification number.

11. The method of claim 1, further comprising the step of:
    (4) allowing a first user on one of the computer workstations and a second user on a sever within the computer network to include a file set on an inclusion list or an exclusion list based on a set of defined rules.

12. The method of claim 11, wherein step (4) comprises storing said inclusion list on said common storage area.

13. The method of claim 11, further comprising the steps of:
    (5) identifying said file set present on one of the computer workstations within the computer network;
    (6) determining when said file set is present on said inclusion list, wherein said inclusion list specifies which files to include in said archive storage area;
    (7) determining when said file set is present on said exclusion list, wherein said exclusion list specifies which files not to include in said archive storage area; and (8) determining whether to copy said file set to said archive storage area based on the determinations of steps (7) and (8).

14. The method of claim 13, wherein step (8) comprises the step of:

determining whether to copy said file set to said archive storage area, based on a priority level assignment of said set of defined rules, when said file set is on both said inclusion list and said exclusion list.

15. A method for restoring files to a computer workstation, within a computer network, from an archive storage area, comprising the steps of:

(1) detecting a commonality list identification number in the archive storage area;

(2) locating a file in a common storage area, which is separate and distinct from the archive storage area, that corresponds to said commonality list identification number; and (3) copying said file from said common storage area to the computer workstation.

16. The method of claim 15, further comprising the steps of:

(4) detecting a unique file in the archive storage area; and (5) copying said unique file from the archive storage area to the computer workstation.

17. The method of claim 15, wherein said common storage area comprises a low latency, high-speed storage medium.

18. The method of claim 15, wherein the archive storage area comprises a magnetic tape storage medium.

19. A system for intelligently managing data in an archival process and a restoration process of a plurality of computer workstations located in a computer network, comprising:

means for creating a signature of a file;

means for determining whether said file is a redundant file present in a pre-determined number of computer workstations within the computer network based on said signature;

means for copying said redundant file to a common storage area;

means for updating a commonality list with said signature of said redundant file;

means for assigning said redundant file a commonality list identification number; and means for placing said commonality list identification number, into an archive storage area.

20. The system of claim 19, further comprising:

second means for determining whether said file is a unique file present on one of the computer workstations within the computer network based on said signature; and second means for copying said unique file into said archive storage area.

21. The system of claim 19, further comprising:

means for reading said commonality list identification number located in said archive storage area;

means for locating said redundant file in said common storage area based on said commonality list identification number; and second means for copying said redundant file from said common storage area to one of the plurality of computer workstations.

22. The system of claim 19, further comprising:

means for detecting a unique file in said archive storage area; and second means for copying said unique file from said archive storage area to one of the plurality of computer workstations.

23. The system of claim 19, wherein said means for creating comprises:

means for creating a data structure containing the name, size, creation date, and creation time of said file;

means for creating a checksum based on the name, size, creation date, and creation time of said file; and means for placing said checksum into said data structure.

24. The system of claim 23, further comprising:

first means for determining when said signature of said redundant file has been previously encountered more than said pre-determined number of times; and second means for determining whether said signature of said redundant file is already on said commonality list to ensure said means for copying, said means for updating, and said means for assigning act upon said redundant file only once during the archival process.

25. The system of claim 19, wherein said common storage area comprises a low latency, high-speed storage medium.

26. The system of claim 19, wherein said second storage area comprises a magnetic tape storage medium.

27. The system of claim 19, wherein said commonality list is stored on a server in the computer network.

28. The system of claim 27, further comprising:

means for copying said commonality list to each of the plurality of computer workstations in the computer network.

29. The system of claim 20, wherein the plurality of computer workstations is divided into a plurality of back-up sets and each of said plurality of back-up sets is assigned a common storage area, a commonality list and a pre-determined number.

30. The system of claim 19, further comprising:

means for directly placing the signature of a new file on said commonality list, wherein said new file is known to be present in at least said pre-determined number of the plurality of computer workstations; and means for assigning said new file a commonality list identification number.

31. The system of claim 19, further comprising:

means for allowing a first user on one of the computer workstations and a second user on a sever within the computer network to include a file set on an inclusion list or an exclusion list based on a set of defined rules.

32. The system of claim 31, wherein and said inclusion list is stored on said common storage area.

33. The system of claim 31, further comprising:

means for identifying said file set present on one of the computer workstations within the computer network;

means for determining when said file set is on said inclusion list, wherein said inclusion list specifies which files to include in said archive storage area;

means for determining when said file set is on said exclusion list, wherein said exclusion list specifies which files not to include in said archive storage area; and means for determining whether to copy said file set into said archive storage area based on said first and second determining means.

34. The system of claim 33, wherein said means for copying said file set into said archive storage area comprises:

means for determining whether to copy said file set to said archive storage area based on a priority level assignment of said set of defined rules, when said file set is on both said inclusion list and said exclusion list.

35. A computer program product comprising a computer usable medium having computer readable program code means embodied in said medium for causing an application program to execute on a computer that intelligently manages data in an archival process and a restoration process of a plurality of computer workstations located in a computer network, said computer readable program code means comprising:

a first computer readable program code means for causing the computer to create a signature of a file;

a second computer readable program code means for causing the computer to determine whether said file is a redundant file present in a pre-determined number of computer workstations within the computer network based on said signature;

a third computer readable program code means for causing the computer to copy said redundant file to a common storage area;

a fourth computer readable program code means for causing the computer to update a commonality list with said signature of said redundant file;

a fifth computer readable program code means for causing the computer to assign said redundant file a commonality list identification number; and a sixth computer readable program code means for causing the computer to place said commonality list identification number, but not said redundant file, into an archive storage area which is separate and distinct from said common storage area.

36. The computer program product of claim 35, further comprising:

a seventh computer readable program code means for causing the computer to determine whether said file is a unique file present on one of the computer workstations within the computer network based on said signature; and an eighth computer readable program code means for causing the computer to copy said unique file into said archive storage area.

37. The computer program product of claim 35, further comprising:

a seventh computer readable program code means for causing the computer to read said commonality list identification number located in said archive storage area;

an eighth computer readable program code means for causing the computer to locate said redundant file in said common storage area based on said commonality list identification number; and a ninth computer readable program code means for causing the computer to copy said redundant file from said common storage area to one of the plurality of computer workstations.

38. The computer program product of claim 35, further comprising:

a seventh computer readable program code means for causing the computer to detect a unique file in said archive storage area; and an eighth computer readable program code means for causing the computer to copy said unique file from said archive storage area to one of the plurality of computer workstations.

39. The computer program product of claim 35, wherein said first computer readable program code means comprises:

a seventh computer readable program code means for causing the computer to create a data structure containing the name, size, creation date, and creation time of said file;

an eighth computer readable program code means for causing the computer to create a checksum based on the name, size, creation date, and creation time of said file; and a ninth computer readable program code means for causing the computer to place said checksum into said data structure.

40. The computer program product of claim 39, further comprising:

an tenth computer readable program code means for causing the computer to determine when said signature of said redundant file has been previously encountered more than said pre-determined number of times; and an eleventh computer readable program code means for causing the computer to determine whether said signature of said redundant file is already on said commonality list to ensure said third, fourth and fifth computer readable program code means act upon said redundant file only once during the archival process.

41. The computer program product of claim 35, further comprising:

a seventh computer readable program code means for causing the computer to directly place the signature of a new file on said commonality list, wherein said new file is known to be present in at least said pre-determined number of the plurality of computer workstations; and an eighth computer readable program code means for causing the computer to assign said new file a commonality list identification number.

42. The computer program product of claim 35, further comprising:

a seventh computer readable program code means for causing the computer to allow a first user on one of the computer workstations and a second user on a sever within the computer network to include a file set on an inclusion list or an exclusion list based on a set of defined rules.

43. The computer program product of claim 42, further comprising:

an eighth computer readable program code means for causing the computer to identify a file set present on one of the computer workstations within the computer network; and a ninth computer readable program code means for causing the computer to determine when said file set is on an inclusion list, wherein said inclusion list specifies which files to include in said archive storage area;

a tenth computer readable program code means for causing the computer to determine when said file set is on an exclusion list, wherein said exclusion list specifies which files not to include in said archive storage area; and an eleventh computer readable program code means for causing the computer to determine whether to copy said file set into said archive storage area based on said ninth and tenth computer readable program code means.

44. The computer program product of claim 43, wherein said eleventh computer readable program code means comprises:

a twelfth computer readable program code means for causing the computer to determine whether to copy said file set to said archive storage area based on a priority level assignment of said set of defined rules, when said file set is on both said inclusion list and said exclusion list.

45. The computer program product of claim 42, further comprising:

an eighth computer readable program code means for causing the computer to use at least one of the following of said set of defined rules:

an "Always Include" rule;

a Sever Explicit File inclusion and exclusion rule;

a Server Wildcard File inclusion and exclusion rule;

a Client Explicit File inclusion and exclusion rule;

a Client Wildcard File inclusion and exclusion rule;

a Server Explicit Directory inclusion and exclusion rule;

a Server Wildcard Directory inclusion and exclusion rule;

a Client Explicit Directory inclusion and exclusion rule;

a Client Wildcard Directory inclusion and exclusion rule;

a Server Explicit Global inclusion and exclusion rule;

a Server Wildcard Global inclusion and exclusion rule;

a Client Explicit Global inclusion and exclusion rule; and a Client Wildcard Global inclusion and exclusion rule.

46. An inclusion-exclusion engine for intelligently managing files and directories in an archival process of a plurality of computer workstations located in a client-server computer network, comprising:

means for excluding from the archival process files that are determined to be redundant data;

means for excluding from the archival process the files and directories that a first user on the server defines as unique garbage;

means for including in the archival process files that said first user defines as critical data;

means for excluding from the archival process files and directories selected by a second user on one of the plurality of computer workstations selects; and means for including in the archival process files and directories selected by said second user selects.

47. The inclusion-exclusion engine of claim 46, further comprising:

a set of rules which allow said first user and said second user to select the files and directories to include in or exclude from the archival process.

48. The inclusion-exclusion engine of claim 47, wherein said set of rules comprises:

an "Always Include" rule;

a Sever Explicit File inclusion and exclusion rule;

a Server Wildcard File inclusion and exclusion rule;

a Client Explicit File inclusion and exclusion rule;

a Client Wildcard File inclusion and exclusion rule;

a Server Explicit Directory inclusion and exclusion rule;

a Server Wildcard Directory inclusion and exclusion rule;

a Client Explicit Directory inclusion and exclusion rule;

a Client Wildcard Directory inclusion and exclusion rule;

a Server Explicit Global inclusion and exclusion rule;

a Server Wildcard Global inclusion and exclusion rule;

a Client Explicit Global inclusion and exclusion rule; and a Client Wildcard Global inclusion and exclusion rule.

49. The inclusion-exclusion engine of claim 47, further comprising:

a graphical user interface that allows said first user and said second user to utilize said set of defined rules.

50. A system for intelligently managing files and directories in an archival process of a computer network, comprising:

a plurality of computer workstations located in the computer network;

a server for initiating and controlling the archival process of said plurality of computer workstations;

a set of rules which allow a first user on one of the plurality of computer workstations and a second user on said server to select the files and directories to include in or exclude from the archival process;

an inclusion list that contains the signature of the files and directories included in the archival process based on a first subset of said set of rules selected by said first and said second user; and an exclusion list that contains the signature of the files and directories excluded from the archival process based on either a second subset of said set of rules selected by said first and said second user or files determined by said server to be redundant data.

51. The system of claim 50, further comprising:

a graphical user interface (GUI) that runs on said server and on said plurality of computer workstations, wherein said GUI allows said first user and said second user to utilize said set of rules to select the files and directories to place on said inclusion list or on said exclusion list.

* * * * *